Jan. 28, 1941. C. N. NEKLUTIN 2,230,065
MATCH-SPLINT CARRIER
Filed Jan. 3, 1939 3 Sheets-Sheet 2
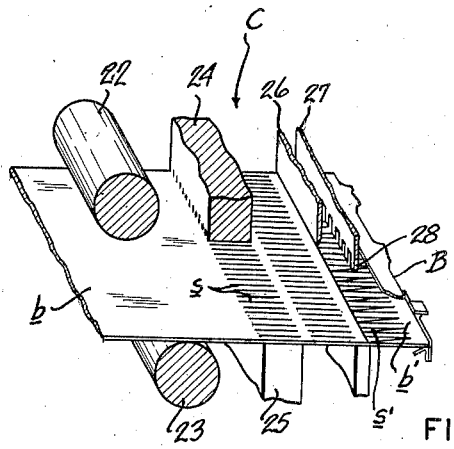
FIG. 7.
FIG. 8.
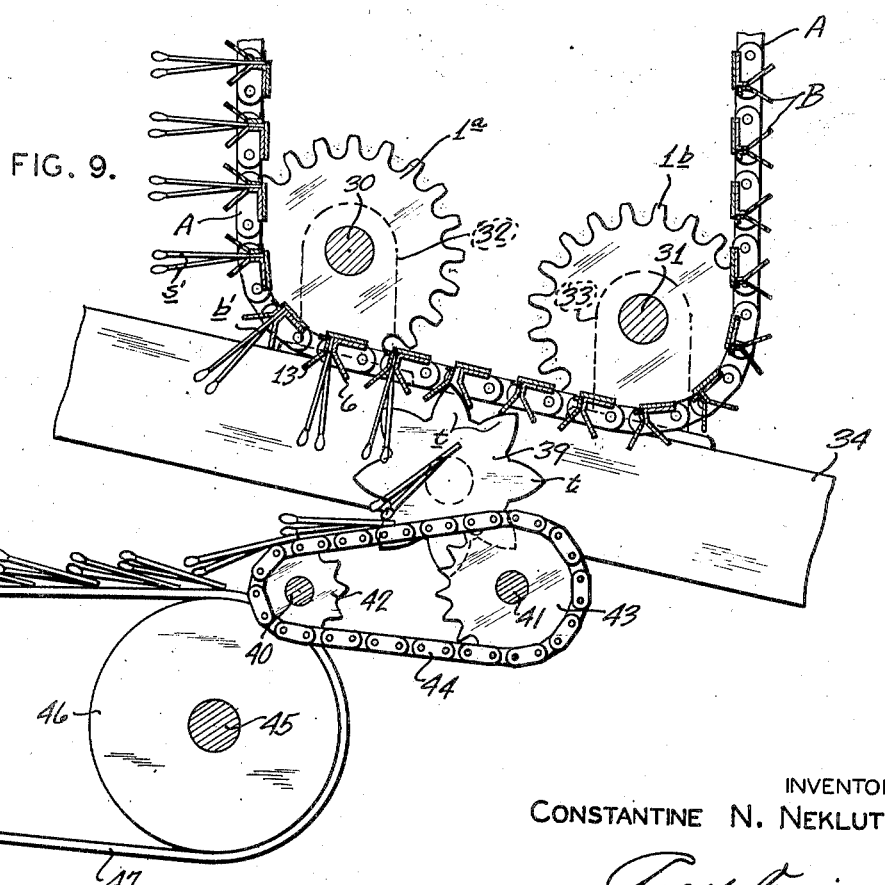
FIG. 9.
INVENTOR
CONSTANTINE N. NEKLUTIN
BY
ATTORNEY Jan. 28, 1941.　　　C. N. NEKLUTIN　　　2,230,065
MATCH-SPLINT CARRIER
Filed Jan. 3, 1939　　　3 Sheets-Sheet 3

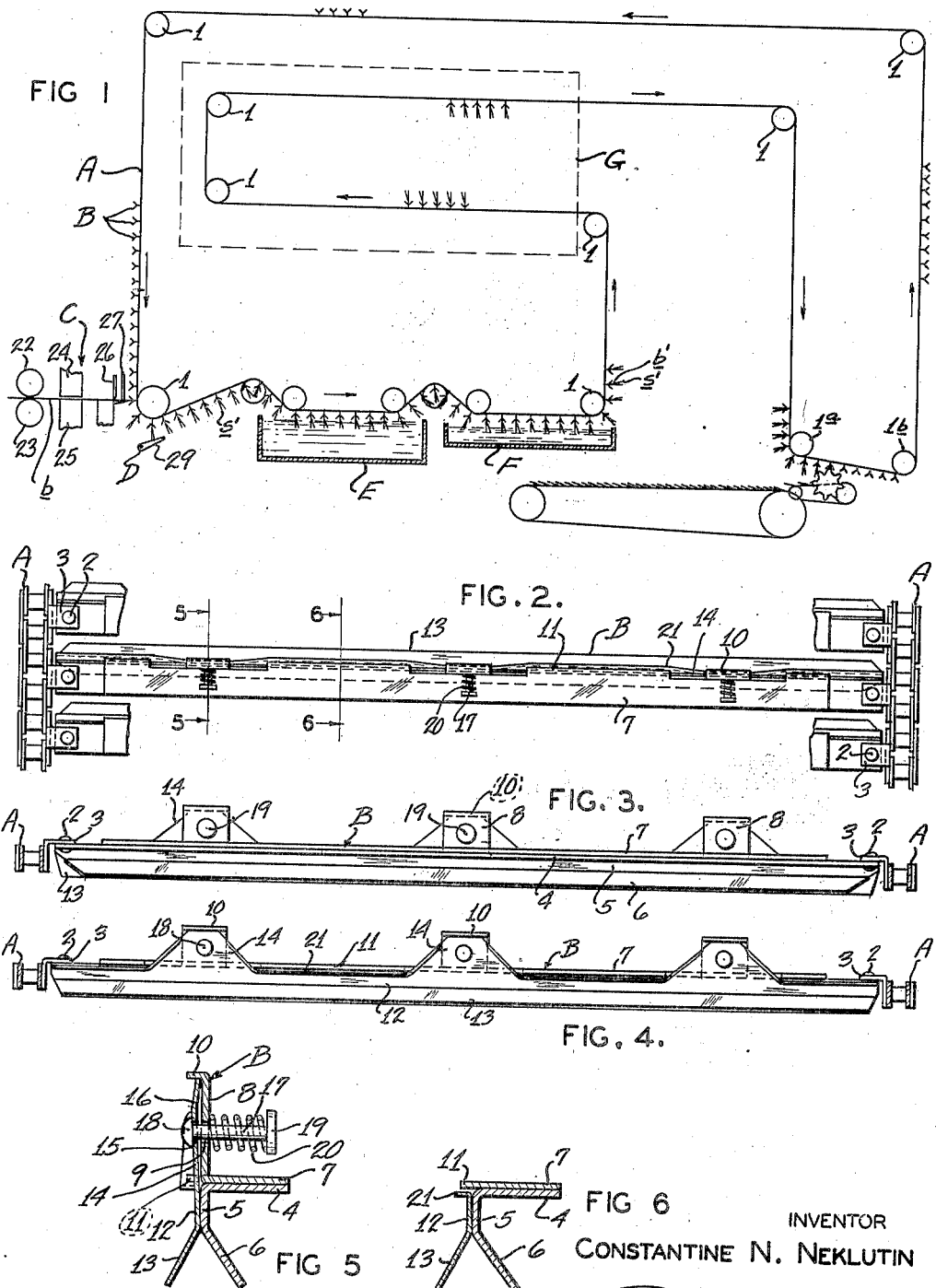

INVENTOR
CONSANTINE N. NEKLUTIN
BY
ATTORNEY

Patented Jan. 28, 1941

2,230,065

UNITED STATES PATENT OFFICE 2,230,065

MATCH-SPLINT CARRIER

Constantine N. Neklutin, Normandy, Mo., assignor to The Universal Match Corporation, St. Louis, Mo., a corporation of Delaware Application January 3, 1939, Serial No. 249,053

10 Claims. (Cl. 198—180)

This invention relates generally to match-book making apparatus and, more particularly, to a certain new and useful improvement in carriers for the splint-sections during dipping and drying operations.

My invention has for its primary objects the provision of a splint carrier which is sturdy and durable and economical in construction, operation, and maintenance, which is positive and exact in gripping, carrying, and releasing the match-splints, which is automatic and capable of high-speed operation, and which is highly efficient in the performance of its stated functions.

And with the above and other objects in view, my invention resides in the novel features of form, construction, arrangement, and combination of parts presently described and pointed out in the claims.

In the accompanying drawings (3 sheets)—

Figure 1 is a diagrammatic view of match-making apparatus including a traveling conveyer comprising splint-carriers of my invention;

Figure 2 is a fragmental plan view of a splint-carrier conveyer constructed in accordance with and embodying my invention;

Figure 3 is a front elevational view of one of the splint carriers;

Figure 4 is a rear elevational view of one of the splint-carriers;

Figure 10:
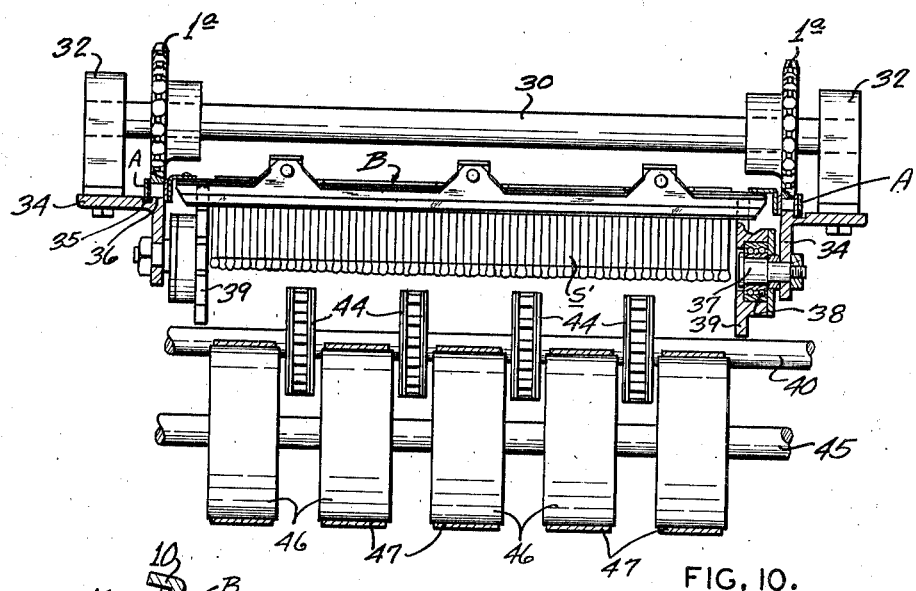
Figure 11:
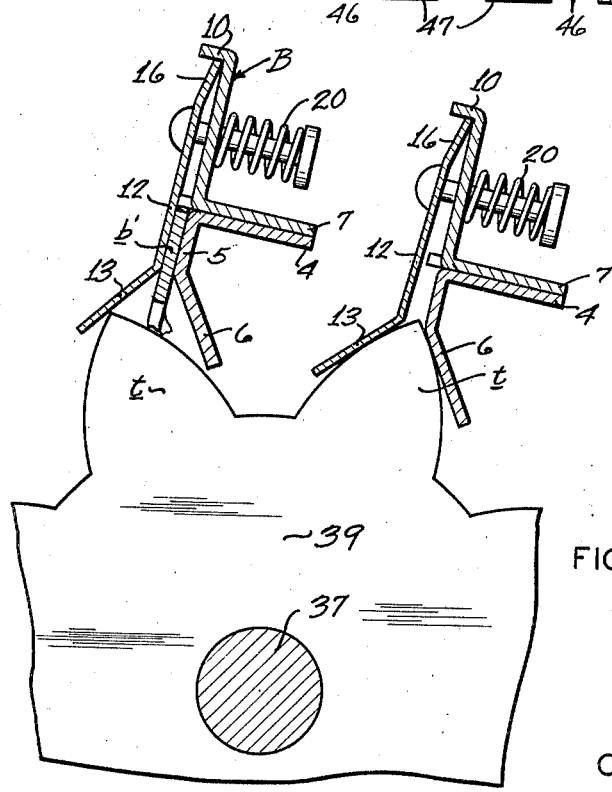

Figures 5 and 6 are vertical sectional views of one of the splint-carriers, taken approximately along the line 5—5 and 6—6, respectively, Figure 2;

Figure 7 is a fragmentary perspective view of the splint cutting and carrier-inserting mechanism of the match-making apparatus;

Figure 8 is a horizontal sectional view of a carrier, illustrating a splint-section in inserted position between the jaws thereof;

Figure 9 is an enlarged vertical sectional view of the splint releasing or discharging mechanism;

Figure 10 is an enlarged front elevational view, partly broken away and in section, of the splint releasing or discharging mechanism; and Figure 11 is an enlarged detail view of the splint releasing mechanism.

Referring now in more detail and by reference characters to the drawings, the match-book constructing apparatus diagrammatically depicted in Figure 1 includes, so far as it is essential to now describe in connection with the splint-dipping holder or carrier of my invention, a conveyer comprising a pair of continuous parallel sprocket chains A and suitably spaced splint-carriers B, the chains A being trained for travel over a plurality of pairs of conventional sprockets 1 and driven by a high-speed intermittent movement mechanism of any conventional design (not shown), and the carriers B being disposed crosswise between, and each riveted or otherwise fixed at its opposite ends, as at 2, to and upon suitable attachment flanges 3 formed preferably integrally with, and projecting inwardly from, the respective links of, the chains A, as best seen in Figures 2 and 3 and for purposes presently more fully appearing.

Each carrier B, in turn, includes a suitably elongated flat strip or bar 4 rolled or otherwise formed peferably of sheet metal and provided marginally with a right-angularly disposed face flange 5 and a lip flange 6, the latter extending outwardly from the outer margin of the face flange 5 at an angle of approximately 120°.

Spot-welded or otherwise fixed flatwise upon the upper face of the strip 4, is an abutment strip or plate 7 provided marginally with a plurality of right-angularly upstanding or upwardly extending tabs 8 suitably spaced legnthwise of the carrier and lying in the same plane as, and substantially forming continuations of, the face flange 5, the tabs 8 being each provided centrally with a transverse aperture, as at 9, and being each bent over at its upper extremity at right angles in the provision of a narrow stop-lip 10.

Intermediate the several tabs 8, the abutment strip 7 is marginally extending and bent over in the provision of preferably forwardly projecting flanges or tongues 11, all as best seen in Figures 5 and 6 and for purposes presently more fully appearing.

Forming part of the carrier and co-operable with the holder bar or strip 4 and its associated members, is a clamping-bar 12 disposed generally flatwise with respect to and for rocking movement upon the face-flange 5 of the bar 4, the bar 12 being provided along its lower margin with a lip-flange 13, which extends outwardly at an angle of approximately 120° to the bar 12 and is disposed in complementary juxta-position, and normally at an angle of approximately 60°, to the lip-flange 6 of the holder bar 4.

At correspondingly spaced points along its upper margin, the clamping-bar 12 is formed with a plurality of upstanding or upwardly extending tongues 14 complementary, in turn, to the tabs 8, the tongues 14 being each centrally provided with an aperture 15 registering with a respective tab-aperture 9 and being each further intermediately offset, as at 16, a distance substantially equal to the thickness of a match-splint and bearing at its upper margin for rocking engagement against the lip 10 of a respective tab 8, as best seen in Figure 5 and for purposes presently more fully appearing.

Loosely extending through the registering pairs of apertures 9, 14, are respective pins or the like 17 each provided at one end with an upset head 18 bearing against the outer face of the particular clamping bar tongue 14 and at its other end with a preferably integral abutment 19 for one end of a compression spring 20 coiled on the pin 17 and at its other end abutting against the outwardly presented face of the tab 8 for resiliently or yieldingly holding the clamping bar 12 in facewise rocking engagement with the face flange 5 of the holder bar 4.

Intermediate the several tongues 14, the clamping bar 12 is right-angularly bent outwardly along its upper margin in the provision of relatively narrow strengthening flange-members 21.

As the chains A and carriers B move downwardly in the operation of the apparatus or machine of Figure 1, the several carriers B successively pass in front of a splint-cutting and injecting mechanism C of more or less conventional type, such mechanism including, it may be here said, a pair of co-operable feed-rolls 22, 23, a pair of co-operably reciprocating die members 24, 25, a reciprocating cutter or blade 26, and a reciprocating spreader bar 27, best seen in Figure 7.

A sheet of cardboard or other suitable match-splint material b is passed between the feed rolls 22, 23, and is intermittently advanced thereby a distance equal to the width of a particular match-splint section, coming to rest intermediate the dies 24, 25, which thereupon are brought together and form in the interposed cardboard sheet b a plurality of spaced parallel slits s. As the dies 24, 25, move retrogressively, the sheet b is advanced another space by the feed rolls 22, 23. During the die-cutting cycle, the conveyer-chains A have been brought to rest with one of the carriers B in horizontal position with its outwardly flaring lips 6, 13, disposed on opposite sides of the plane of the sheet b. While the conveyer-chains A remain momentarily stationary, the sheet b is again advanced by the feed rolls 22, 23, whereupon the sheet b at its forward transverse margin is shifted between said lips 6, 13, and is then clampingly held or gripped between the clamping bars or jaws 12 and 4 of the particular carrier B. As the sheet b now comes to rest in such clamped or gripped position, the cutter 26 is brought downwardly, shearing off a section, as b', along a line intersecting the inner ends of the slits s, thereby forming a plurality of connected match-splints s'.

Thereupon, the spreader bar 27, which is equipped with a plurality of downwardly projecting suitably spaced fingers 28 positioned for engagement with every other one of the splints s', moves downwardly into engagement with the momentarily stationary blank b', angularly bending and disposing every other splint s' of the particular section b' downwardly out of the plane of the remaining splints s' of the set, all as best seen in Figures 7 and 8.

The conveyer-chains A are now advanced one step and the above described cycle of operations repeated for inserting or injecting the next succeeding connected set of match-splints into the next succeeding carrier B.

Now positioned along the path of movement of the conveyer-chains A and carriers B and spaced forwardly from the mechanism C, is a so-called splint seating mechanism D, which comprises a horizontally mounted rocking plate 29 suitably actuated in any conventional manner for intermittent upward swinging or oscillatory movement during the stationary period of the conveyer-chains A. As it moves upwardly, the plate 29 engages the outwardly presented ends of the match-splints s' and directs the section b' upwardly into seated edgewise abutting engagement against the tongues 11 of the particular carrier B, as diagrammatically indicated in Figure 1. And it may be pointed out in this connection that, due to the size and shape of the offset lip 16, the opposed splint-engaging faces of the bars 4 and 12 will be substantially parallel when the splint-section b' is in place.

The conveyer-chains A and carriers B now move forwardly in substantially conventional manner over, in succession, a paraffin tank E for coating the ends of the held match-splints s' with paraffin and a dipping tank F for applying a coating of striker substance to the paraffined tips and then through a drier G. Moving out of the drier G, the chains A pass around pairs of sprockets 1ª, 1ᵇ, respectively mounted on shafts 30, 31, which are, in turn, journaled on suitable standards 32, 33, fixed on obliquely disposed preferably angle iron supporting frame members 34 provided with longitudinally extending chain guide grooves 35 in the provision of a short downwardly inclined conveyer chain-run, as at 36, all as best seen in Figure 9 and for purposes presently more fully appearing.

Suitably mounted upon, and extending horizontally inwardly from, the frame-members 34, are bearing-studs 37 provided preferably with anti-friction bearings 38 for rotatively supporting splint-releasing sprockets 39 each having a plurality of radially outwardly extending peripheral teeth t shaped and spaced for spreading engagement between the lips 6 and 13 of the respective carriers B for shifting or spreading the clamping jaw 12 relatively rearwardly away from the jaw 4, as best seen in Figures 9 and 11, for releasing the splint-sections b'.

As will be evident, the releasing sprockets 39 are freely rotatable and, therefore, will be driven rotatively by and under engagement with the successive carriers B as the latter are moved forwardly by the conveyer-chains A.

Rotatively mounted under the releasing sprockets 39, is a pair of parallel shafts 40, 41, mounted on which are spaced pairs of peripherally registering sprockets 42, 43, for driving conveyer chains 44.

Rotatively mounted below the shafts 40, 41, is a shaft 45 loosely journaled on which is a plurality of spaced belt pulleys 46 for supporting conveyer belts 47 disposed for free traveling movement between the conveyer chains 44, as best seen in Figure 10.

The shaft 45 is rotated at a rate of speed somewhat slower than the rate of rotation of the shafts 40, 41, which are, in turn, driven at a speed sufficient to advance the conveyer chains 44 a distance somewhat shorter than the width of the several splint-sections b' in the interval of time required for a complete cycle of movement of the conveyer-chains A. It will hence be evident that, as each loaded carrier B moves forwardly over the discharge or releasing sprockets 39 during the intermittent movement periods of the conveyer-chains A, the particular carrier B will be actuated to splint release and the carried splint-section b' will drop downwardly upon the chains 44. Now, since the chains 44 are continuously moving, while the released splint-section b' has momentarily lost any progressive movement, the released splint-section b' will be tipped head forward, as illustrated in Figure 9. The next succeeding splint-section b', upon being released from its particular carrier B, will drop downwardly and fall with its tipped end in overlying registration upon the splint-connection portion of the preceding splint-section b'. From the conveyer-chains 44, the released and delivered splint-sections b' will be continuously discharged upon the companion conveyer-belts 47. By reason of the fact that the conveyer-belts 47 are moving at a slower rate of speed than the conveyer-chains 44, each splint-section b' will be pushed forwardly over and upon the preceding splint-section b' for subsequent handling in the covering and stapling mechanism (not shown) of the apparatus.

The carriers B firmly flatwise grip the successive splint-sections b' throughout their length and prevent any transverse warping or other form of deformation during dipping and drying operations. Further, the carriers B and their associated mechanism are sturdy and durable in structure, automatic in operation, and efficient in the performance of their respective intended functions, and it should be understood that changes and modifications in their form, construction, arrangement, and parts may be made and substituted for those herein shown and described without departing from the nature and principle of my invention.

Having thus described my invention, what I claim and desire to secure by Letters Patent is—

1. In match-making apparatus, a match-splint carrier comprising a pair of rigid strip-jaws rockably co-operable for gripping flatwise therebetween the marginal portion of an inserted splint-section, and means for yieldingly retaining the jaws in gripping engagement with the split-section, said means including a plurality of pairs of facewise overlying co-operable tongues on the jaws, a headed pin extending through and loosely engaging each pair of tongues, and springs coiled on the pins and having impinging engagement with some of the tongues and the heads of the pins.

2. In match-making apparatus, a pair of strip-jaws co-operable for gripping flatwise therebetween the marginal portion of an inserted splint-section, rigid flanged tongues on one of said jaws, rigid tongues on the other of said jaws having edgewise abutting engagement with the first tongues for rocking movement of the jaws to and from splint-section engagement, and means for yieldingly retaining the jaws in splint engagement.

3. In match-making apparatus, a pair of strip-jaws co-operable for gripping flatwise therebetween the marginal portion of an inserted splint-section, rigid flanged tongues on one of said jaws, rigid intermediately offset tongues on the other of said jaws having edgewise abutting engagement with the first tongues for rocking movement of the jaws to and from splint-section engagement, and means for yieldingly retaining the jaws in splint engagement.

4. In match-making apparatus, a pair of strip-jaws co-operable for gripping flatwise therebetween the marginal portion of an inserted splint-section, rigid flanged tongues on one of said jaws, rigid intermediately offset tongues on the other of said jaws having edgewise abutting engagement with the first tongues for rocking movement of the jaws to and from splint-section engagement, and means having engagement with said tongues for yieldingly retaining the jaws in splint engagement.

5. In match-making apparatus, in combination, a traveling conveyer comprising a match-splint carrier including a pair of yielding co-operable strip-jaws for flatwise releasably gripping a splint-section therebetween, said jaws being provided along a longitudinal margin with outwardly flaring opposed lips, and means engageable with said lips for spreading the jaws for release of the gripped splint-section.

6. In match-making apparatus, in combination, a traveling conveyer comprising a match-splint carrier including a pair of yielding co-operable strip-jaws for flatwise releasably gripping a splint-section therebetween, said jaws being provided along a longitudinal margin with outwardly flaring opposed lips, and means including a sprocket-member having peripheral teeth for engagement with said lips for spreading the jaws for release of the gripped splint-section.

7. A match-splint carrier including a first strip having a plurality of flanged tabs, a second strip disposed in facewise overlying relation upon the first strip and having a plurality of tongues each rockingly engaged with a co-operable tab, and means for yieldingly holding the strips together for retentively gripping a match-splint.

8. In match-making apparatus having traveling conveyer means, a match-splint carrier including a first strip-jaw mounted at its ends in the conveyer means, a second strip-jaw operably mounted on the first jaw for holding a match-splint section against the first jaw, said jaws being provided along adjacent longitudinal margins with outwardly flaring lip portions, and means engageable with said lip portions for shifting the second jaw from the first jaw for releasing the match-splint.

9. A match-splint holder including an elongated first jaw having a plurality of spaced tabs projecting therefrom, a second jaw having a plurality of projecting tongues for edgewise abutting engagement with the tabs, and means for yieldingly holding the second jaw against the first jaw for retentively gripping the match-splints.

10. In match-making apparatus, a match-splint carrier comprising a flight member having a flat longitudinal flange, and a plurality of apertured tabs projecting upwardly from and lying in the same plane as the flange, a jaw member disposed flatwise upon the flange and having a plurality of apertured tabs projecting outwardly from one longitudinal margin thereof in registration with the flight tabs, a headed pin extending loosely through the apertures of each pair of registering tabs, and means on each of the pins for resiliently urging the strip and flange together.

CONSTANTINE N. NEKLUTIN.